(12) United States Patent
Friedland

(10) Patent No.: US 9,958,140 B2
(45) Date of Patent: May 1, 2018

(54) MILITARY PROJECTOR WITH RELATIVELY MOVABLE NEGATIVE AND POSITIVE LENSES

(71) Applicant: Leonard Henry Friedland, Sandton (ZA)

(72) Inventor: Leonard Henry Friedland, Sandton (ZA)

(*) Notice: Subject to any disclaimer, the term of this patent is extended or adjusted under 35 U.S.C. 154(b) by 185 days.

(21) Appl. No.: 14/901,397

(22) PCT Filed: Jun. 27, 2014

(86) PCT No.: PCT/ZA2014/000030
§ 371 (c)(1),
(2) Date: Dec. 28, 2015

(87) PCT Pub. No.: WO2015/003195
PCT Pub. Date: Jan. 8, 2015

(65) Prior Publication Data
US 2016/0138783 A1    May 19, 2016

(30) Foreign Application Priority Data

Jun. 27, 2013  (ZA) .................................. 2013/04173

(51) Int. Cl.
*F21V 14/06* (2006.01)
*F21V 5/00* (2018.01)
(Continued)

(52) U.S. Cl.
CPC ............. *F21V 14/06* (2013.01); *F21V 5/008* (2013.01); *F21V 9/04* (2013.01); *F21V 13/02* (2013.01);
(Continued)

(58) Field of Classification Search
CPC . G02B 7/023; G02B 7/14; G02B 7/16; G02B 7/24; G02B 5/208; G02B 7/10;
(Continued)

(56) References Cited

U.S. PATENT DOCUMENTS 3,090,282 A * 5/1963 Angenieux ............... G02B 7/10
                                                     359/823
5,144,493 A * 9/1992 Nomura .................... G02B 7/10
                                                     359/693
(Continued)

FOREIGN PATENT DOCUMENTS

| DE | 1125762 B | 3/1962 |
|---|---|---|
| WO | 0049334 A1 | 8/2000 |
| WO | 2012058699 A2 | 5/2012 |

OTHER PUBLICATIONS

International Search Report and Written Opinion for PCT/ZA2014/000030.

*Primary Examiner* — Anh Mai
*Assistant Examiner* — Steven Horikoshi
(74) *Attorney, Agent, or Firm* — McClure, Qualey & Rodack, LLP

(57) ABSTRACT

A military projector comprises a tubular housing that contains a high intensity lamp, a reflecting mirror behind the high intensity lamp, a negative lens which is carried in a first mounting member located in front of the lamp, and a pair of positive meniscus lenses which axe mounted in a second mounting member spaced from and movable relative to the negative lens so that the distance between the negative and positive lenses can be varied. A carrier member having a clear opening and an opening containing a filter is located between the negative and positive lenses. A moving means moves the carrier member between a first position in which the light passes through the filter before reaching the positive meniscus lenses and a second position in which the light (Continued)

passes through the clear opening. An elongated tubular electromagnetic shield extends beyond the meniscus lenses.

14 Claims, 8 Drawing Sheets

(51) Int. Cl.

| | |
|---|---|
| *F21V 9/04* | (2018.01) |
| *F21V 13/02* | (2006.01) |
| *F21V 14/08* | (2006.01) |
| *F21V 17/02* | (2006.01) |
| *F21V 29/67* | (2015.01) |
| *F21V 29/70* | (2015.01) |
| *F21V 13/04* | (2006.01) |
| *F21V 13/14* | (2006.01) |
| *G02B 5/20* | (2006.01) |
| *G02B 7/10* | (2006.01) |
| *F21V 5/04* | (2006.01) |
| *F21W 131/40* | (2006.01) |

(52) U.S. Cl.
CPC ............... *F21V 13/04* (2013.01); *F21V 13/14* (2013.01); *F21V 14/08* (2013.01); *F21V 17/02* (2013.01); *F21V 29/677* (2015.01); *F21V 29/70* (2015.01); *G02B 5/208* (2013.01); *G02B 7/10* (2013.01); *F21V 5/048* (2013.01); *F21W 2131/40* (2013.01)

(58) Field of Classification Search
CPC ........ F21L 15/04; F21W 2131/40; F21B 9/04; F21V 17/02; F21V 13/04; F21V 13/14; F21V 19/04; F21V 5/008; F21V 14/06; F21V 14/065; F21V 14/08; F21V 14/085
See application file for complete search history.

(56) References Cited

U.S. PATENT DOCUMENTS

2005/0254233 A1* 11/2005 Alessio .................... F21L 4/00
362/169
2012/0075843 A1* 3/2012 Battis .................... F41A 33/02
362/157

* cited by examiner

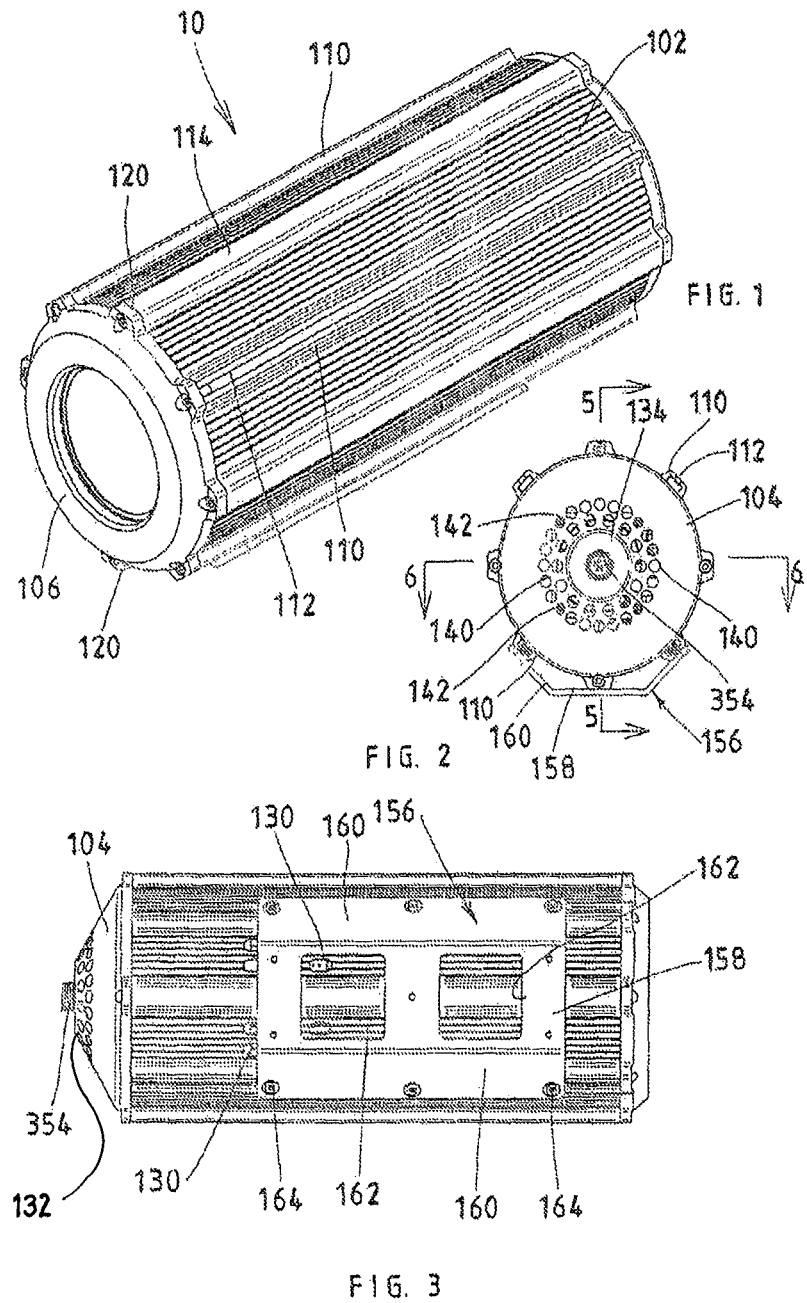

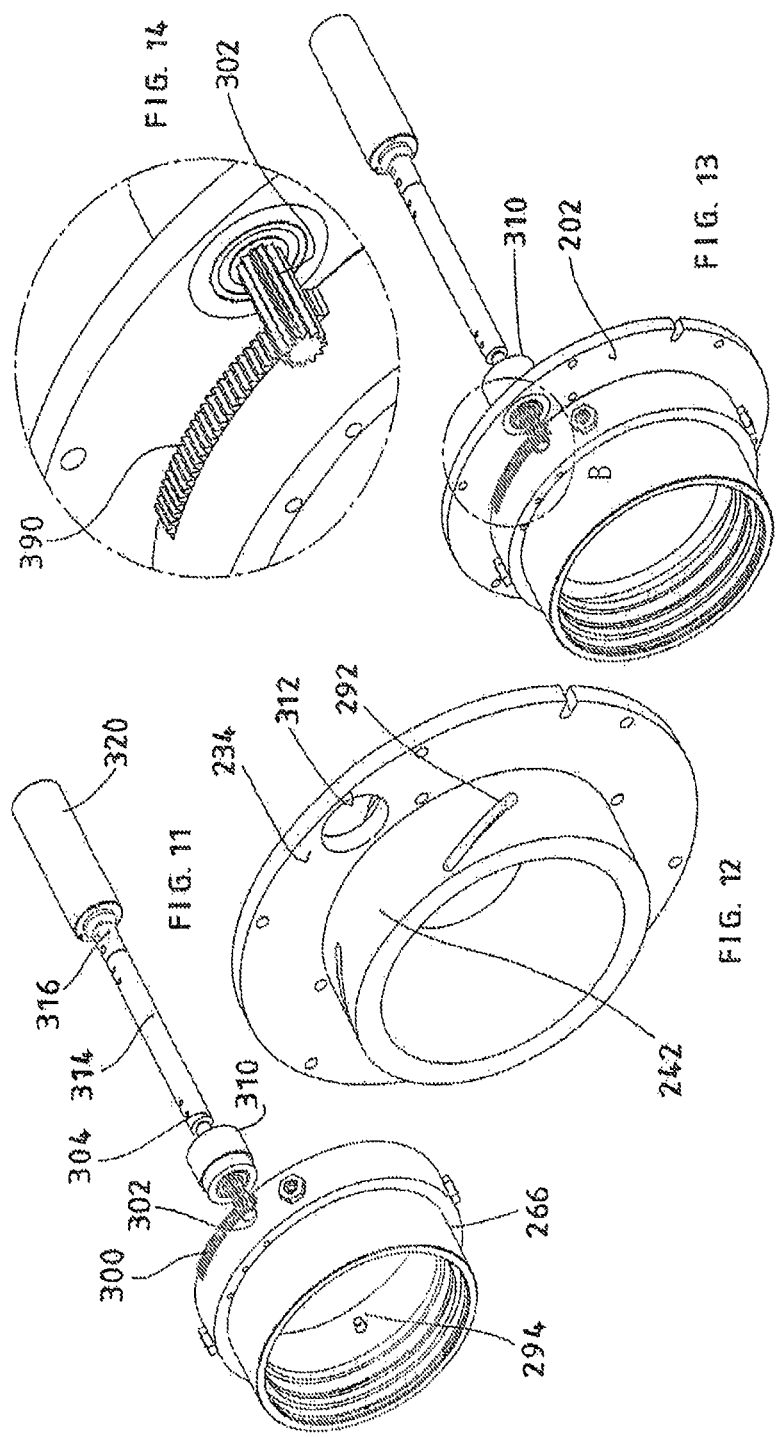

MILITARY PROJECTOR WITH RELATIVELY MOVABLE NEGATIVE AND POSITIVE LENSES

This invention relates to projectors.

The invention is concerned with a projector which emits a high powered highly concentrated beam that extends over a significant distance of say 1000 to 2000 meters or more. (Such a projector is sometimes also referred to as "a search light" or a "torch"). The projector has particular applicability for unitary and security purposes and is referral to herein as "a military projector".

In my co-pending patent application No 2013/03735 (WO 2012/058699) I have described and illustrated a military projector comprising a tabular housing that contains a high intensity lamp, a reflecting mirror behind the high intensity lamp, a negative lens, in the form of a bi-concave lens, which is located before the lamp and pair of positive meniscus lenses spaced from the negative lens and located near the front of the housing.

I have now made improvements or developments to this projector.

SUMMARY OF THE INVENTION

According to one aspect of the present invention there is provided a military projector comprising a tubular housing that contains a high intensity lamp, a reflecting mirror behind and preferably forming a part of the high intensity lamp, a negative lens which is carried in a first mounting member located in from of the lamp and a pair of positive meniscus lenses which are mounted in a second mounting member spaced from the negative lens characterised in that the second mounting member is capable of being moved relative to the first mounting member so that the distance between the negative lens and the positive meniscus lenses can be varied.

Preferably both the mounting members are cylindrical or have parts which are cylindrical and are capable of relative rotation, preferably the second mounting member being rotatable relative to the first mounting member, and there is provided cam and cam follower means connecting the two mounting members so that when there is relative rotation between the mounting members, the second mounting member will be moved towards or away from the first mounting member. In this way the cone angle of the light beam emitted by the projector can be varied. The cam and cam follower member preferably comprise a plurality of (preferably four) cams and a plurality of cam followers respectively engaging the cams. The cams are preferably cam grooves formed in the first mounting member and the cam followers are pins carried by the second mounting member.

Preferably a toothed part is mounted on the second mounting member and a pinion engages this toothed part, the pinion being rotatable by a motor ("the adjusting motor") to rotate the second mounting member. The rotation of the second mourning member is preferably quite small and preferably of the order of say 20.degree. The relative movement between the positive meniscus lenses and the negative lens also is quite small being of the order of 7 mm. This will enable the projector to emit a beam which diverges either very slightly or a little more and thus can illuminate an area of about thirty five meters diameter at 1000 meters when the distance between the meniscus lenses and the negative lens is at a maximum and about one hundred and five meters at 1000 meters when that distance is at minimum.

Preferably there is provided a filter carrier adapted to carry an infra-red filter, the filter carrier being pivoted to the second mounting member so as to pivot about a pivot between (i) an operative position in which the filter is in the path of rays passing through the meniscus lenses and (ii) an inoperative position outside the said path. Moving member preferably including an electric motor is provided to move the filter carrier from the operative to the inoperative position positions and vice versa. Preferably the filter carrier has a lever being pivoted to a connecting member at the other end of which is movably by an electric motor.

The high intensity lamp is preferably a short are Xenon ceramic lamp preferably having an anode connector at one end and a cathode connector at the other. A fan is normally provided to cool the lamp in use. A main heat sink is preferably also provided to keep the anode (or cathode) cool and a secondary heat sink is preferably also provided to keep the cathode (or anode) cool. The two heat sinks are preferably spaced to prevent arcing.

An embodiment of the invention will now be described by way of example with reference to the accompanying drawings.

SHORT DESCRIPTION OF THE DRAWINGS

In the drawings:

FIG. 1 is a perspective view of a projector of the invention;

FIG. 2 is a rear end view of the projector;

FIG. 3 is an under view of the projector;

FIG. 11 is a perspective detail of an adjustable lens carrier of the projector;

FIG. 12 is a similar view of the rear holder;

FIG. 13 is a similar view showing the adjustable lens carrier mounted on the rear holder; and FIG. 14 is an enlarged detail of the pinion and rack.

Figure 4:
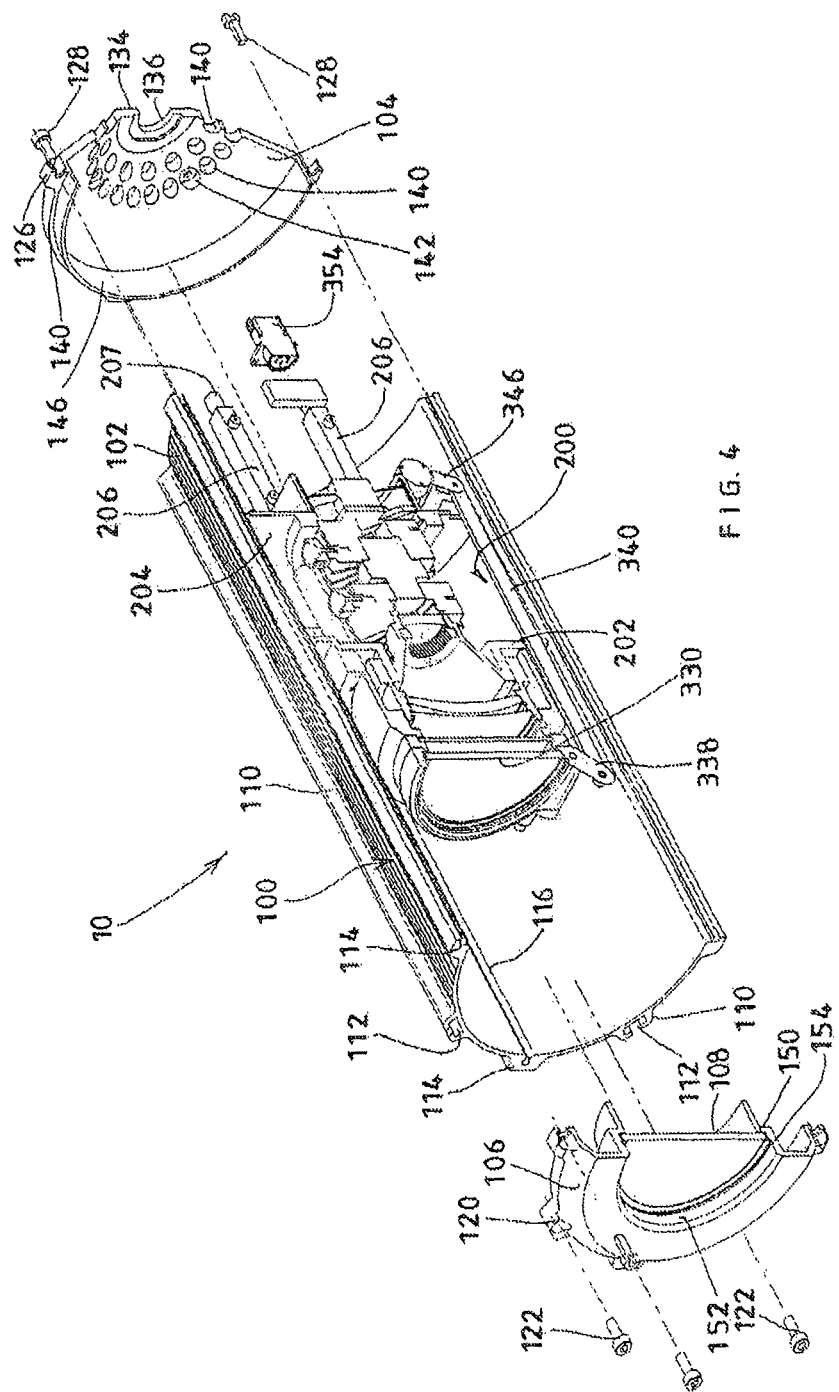
FIG. 4 is a partially exploded longitudinal perspective section through the projector.

Referring now to the drawings there is shown a military projector 10 of the invention. The projector comprises a containment 100 within which is a light emitting device.

The containment 100 consists of an extruded cylindrical aluminium housing 102 with a rear end closure member 104 and a front annular end closure 106 which holds a glass closure disc 108. The housing 102 is 440 mm long and 185 mm outside diameter. It has a wall thickness of 3 mm.

On its exterior, the housing 102 has four equi-spaced enlarged longitudinally extending portions 110 within which are formed respectively inverted outwardly opening T-shaped grooves 112 (see FIGS. 1 and 2). Equi-spaced between the portions 110 are four enlarged portions 114 with inwardly opening keyhole section slots 116.

The front end closure 106 has eight projecting lugs 120 which can be and are aligned, four with the portions 110 and four with the portions 114. Screws 122 passing through openings 124 (see FIG. 4) in the lugs 120 engage in the grooves 112 and two slots 116 to secure the front closure 106 to hold it on the front of the housing 102. The rear end closure member 104 has four projecting lugs 126 which can be and are aligned with the enlarged portions 114. Screws 128 passing through openings 129 in the lugs 126 engage in the slots 116 to secure the end closure member 104 to the rear end of the housing 102.

Eight substantially ovaloid vent openings 130 are provided midway of the length of the housing 102.

The rear end closure member 104 is an aluminium member. It has a frusto conical body 132 and a transverse plane surface 134 at its smaller end. An enlarged opening 136 passes through this surface 134. The opening 136 is substantially circular with a chordal flat 138. Surrounding the surface 134 in the body 132 are two sets of equally aligned cylindrical openings 140 of the same diameter arranged on two circles centered on the centre of the opening 136. There are four smaller holes 142 in the larger circle. The thickness of the body 132 is the same as the diameter of the openings 140.

The end closure member 104 has a cylindrical end part 144, the outer diameter of which is the same as that of the housing 102. The end 146 of the end part is of reduced diameter so as to fit into the end of the housing 102.

Figure 5:
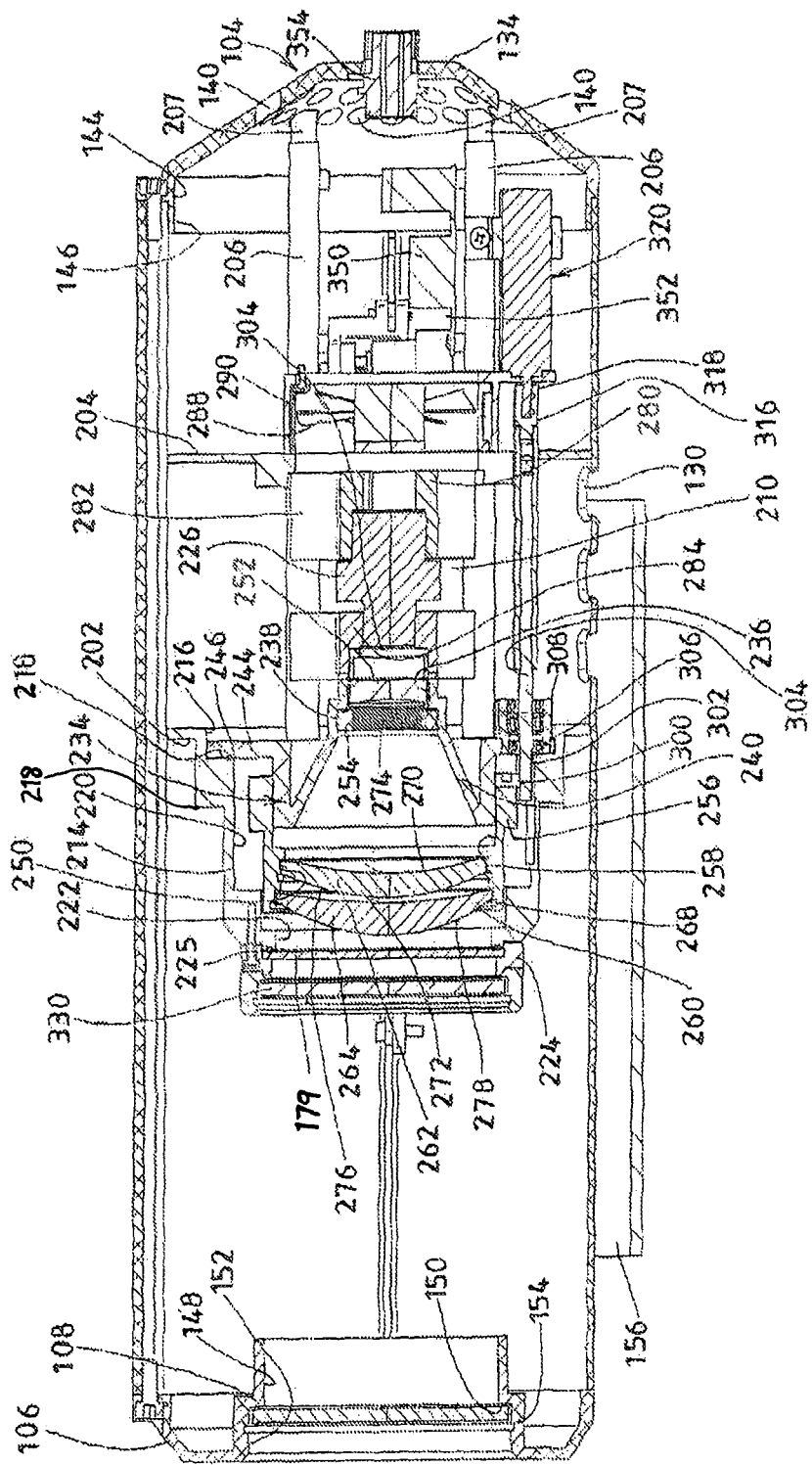
FIG. 5 is a section on line 4-4 of FIG. 2.

The front end closure 106 has a cylindrical inner bore 148 which increases at a step 150 to a main bore 152 (see FIGS. 4 and 5). The glass closure disc 108 rests on the step 150 and is held in position by a circlip (not shown) fitting in a groove 154 in the main opening 152.

The aluminium housing 102 serves as an electromagnetic barrier to contain the electro magnetic radiation emanating from the lamp which will be described below.

A mounting bracket 156 (best shown in FIGS. 2 and 3) is provided. The mounting bracket 156 comprises a base 158 and two elongated side arms 160. Plates (not shown) fit in two adjacent grooves 112. Each plate has threaded apertures. Screws 164 passing through apertures in the arms 160 engage in the threaded apertures in the plates to hold the bracket 156 in position. By tightening the screws 164, the arms 160 can be damped between the material of the portions 110 at the groove 112 so that the bracket 156 is secured firmly to the housing 102. The base 158 of the mounting bracket 156 has cut out portions 162 to reduce weight. The base 158 can be modified as desired so that the projector 10 can be mounted on to any apparatus as is required, such as on a machine gun.

Within the housing 102 is a light emitting device 200 (best shown in FIG. 5). The light emitting device 200 comprises a mounting unit comprising a front disc like plate 202 and a rear disc plate 204 which are located on either side of the set of vent openings 130 and extend to the inner surface of the housing 102. The rear plate 204 is secured to the back end closure 104 by four square section posts 206 which have turned rear ends 207 of cylindrical shape. These ends 207 pass through the smaller openings 142 where they are engaged by screws (not shown) to secure them to the rear end closure 104. The front ends of the posts 206 have internally threaded blind bores. Four threaded members 208 (not shown) pass through small openings in the rear plate 204 (see FIG. 4) and their rear ends engage in the blind bores of four rods 210 which extend to the front plate 202. The front plate 202 is comprised by a flange of a front cylindrical carrier member 214. This member 214 has a large rear bore 216, a step 218 leading to the main bore part 220, and a front bore part 222. An end ring 224 is secured to the end of front carrier member 214 by screws 225.

Figure 7:
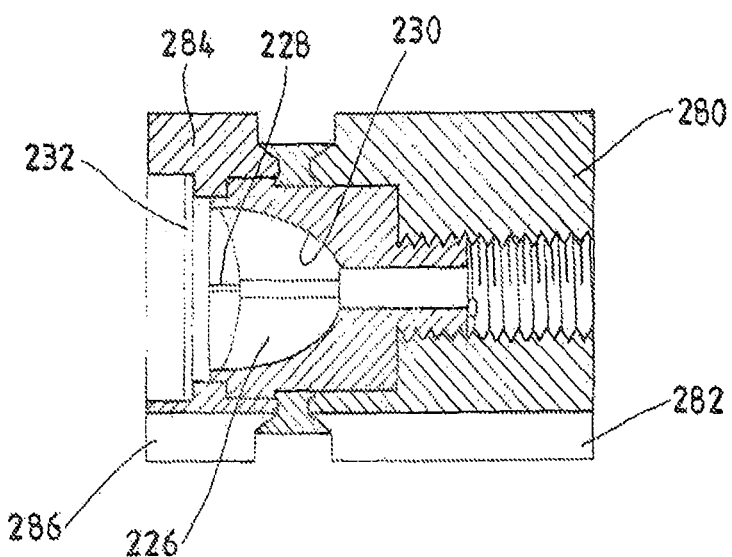
FIG. 7 is a longitudinal section through the lamp holder.
Figure 8:
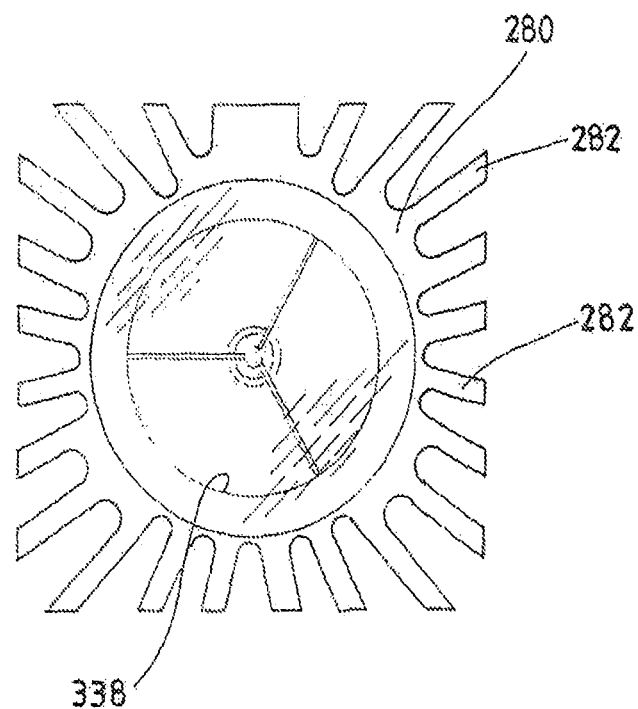
FIG. 8 is a front view of the lamp located in the heat sink.
Figure 9:
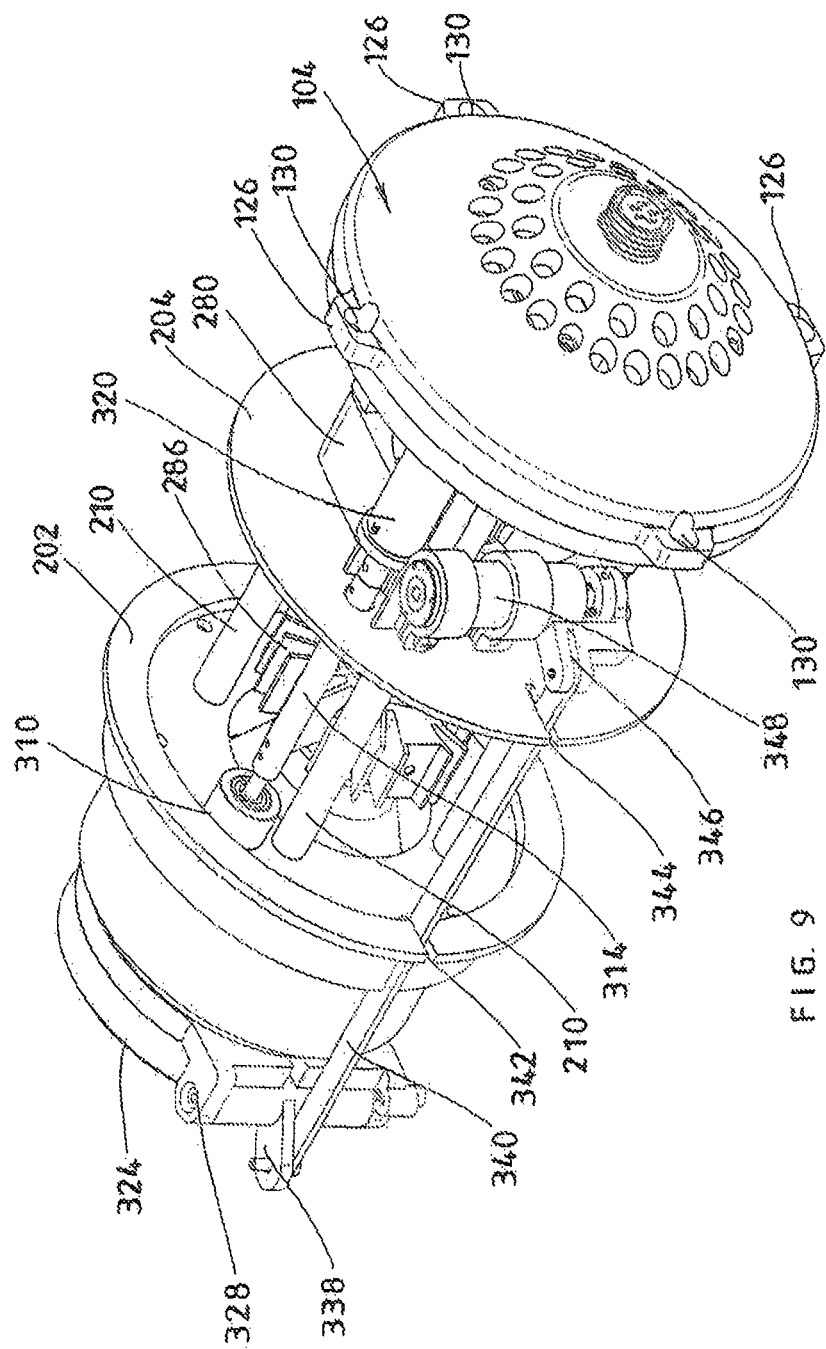
FIG. 9 is a rear perspective view of the lighting unit and the rear end closure.

Carried by the mounting unit between the front and rear plates 202 and 204 is a lamp housing 226 carrying a high intensity ceramic Xenon short arc lamp 228 (see FIG. 7) having an integral parabolic reflector 230 and a clear front window 232. The window has a diameter of 12.7 mm (½"). The lamp and reflector will be described further below.

A rear carrier member 234 is provided. The rear carrier member 234 has a rear bore 236 and a larger intermediate bore 238 leading to conical section 240. A rearwardly extending cylindrical member 242 extends from the end of the conical section to flange 244. The edge of the flange 244 received in rear bore 216 of the front carrier member 214 butting against the step 218 between the bores 216 and 220 and being sealed thereto by an "O" ring seal 246. A negative lens in the form of a plano-concave lens 250 is mounted in the rear bore 236, which is in front of the lamp 228, with the plane surface 252 closer to the lamp 228. A ring 254 having very fine threads is threaded into the larger bore 238 of the rear carrier member 234 which is correspondingly threaded to hold the lens 250 in position. The interior surface of the ring 254 has fine annular grooves to prevent light being reflected off this surface.

An intermediate lens carrier 256 is located between the rear carrier member 234 and the front carrier member 214. The lens carrier 256 has a main bore 258 which fits on and is axially and rotatably slidable upon the rear cylindrical member 242. The relationship between the rear and intermediate carriers 234 and 256 will be described further below. The front end of the carrier 256 has steps 259 and 260 to carry two positive meniscus lenses (concave/convex lenses) 262 and 264 spaced closely apart. Circlips 268 hold the lenses 262 and 264 in position. The axes of the lamp 228, the reflector 230 and the lenses 252, 262 and 264 are all aligned.

The inner meniscus lens 262 has a diameter of 86 mm. Its rear concave surface 270 has a radius of 165.5 mm and its front convex surface 272 has a radius of 104.81 mm. The distance of the deepest point of the rear surface 270 from the deepest point in the surface 274 of the negative lens 250 is 64.13 mm when the carrier 256 is in its rearmost position as will be described.

The outer meniscus leas 264 has a diameter of 92 mm. Its rear concave surface 276 has a radius of 243.2 mm and its front convex surface 278 has a radius of 87.54 mm. The distance of the deepest point of the rear surface 276 of the outer meniscus lens 264 from the forward most point of the front surface 272 of the inner lens 262 is 1 mm.

In front of the meniscus leases 262 and 264 is a clear window 179 mounted as will be described below.

A main heat sink 280 having vanes 282 surrounds the rear end of the lamp housing 226 surrounding one of the terminals of the lamp. Spaced from the main heat sink 280 is a front heat sink 284 having vanes 286. The front beat sink 284 surrounds the other terminal of the lamp housing.

Figure 10:
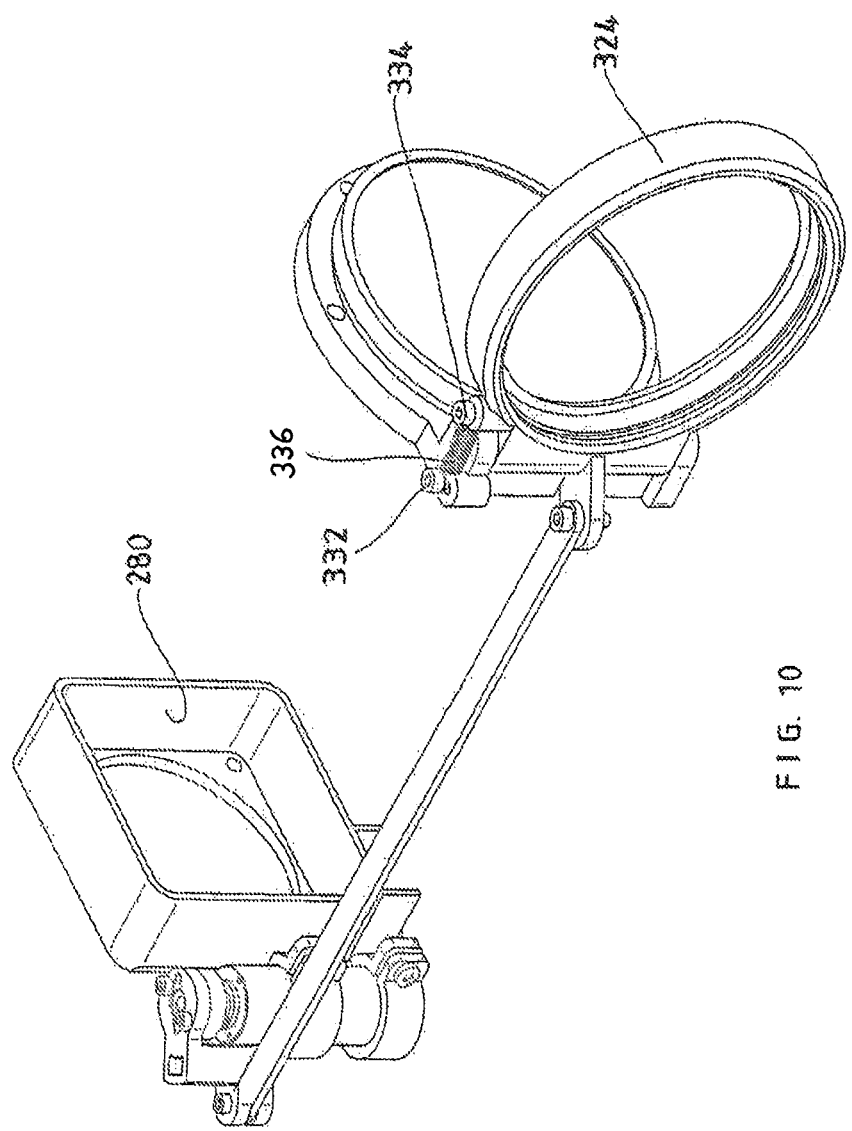
FIG. 10 is a perspective view from the front of the filter moving means.

A fan 288 is carried in a housing 290 (best shown in FIG. 10) secured to the plate 204. In use the fan 288 draws air in through openings 140 in the end closure 104 and blows the air over the vanes 282 and 286 of the heat sinks 280 and 284. The air then escapes through the vent openings 130. The front and rear plates 202 and 204 serve as baffles which prevent the air passing forwardly of the front plate 202 and rearwardly of the rear plate 204.

Four cam slots 292 (best shown in FIG. 12) are provided in the outer surface of the rear cylinder 242. The cam slots 292 are inclined to a plane normal to the axis of the rear cylinder 242 extending towards the upper end of the cylinder 242.

Four pins 294 pass through the lens carrier 256 and engage in the cam slots 292 to form cam followers.

A short arcuate gear rack 300 is mounted on a portion of the surface of the lens carrier 256 (see FIG. 12). An elongated pinion 302 meshes with this rack 300. The pinion 302 is carried on a short shaft 304 extending rearwardly thereof and being fitted into bearings 306 and 308 in a cylindrical carrier 310 which fits in an opening 312 the front plate 202. The rear end of the shaft 304 enters a hollow insulated drive shaft 314 (hereinafter called the "adjusting shaft") that emends between the front plate 202 and the rear plate 204. The shaft 314 is connected to a coupling member 316 which engages the drive shaft 318 of an electric motor 320 (hereinafter called the "adjusting motor") mounted on two posts 206. The adjusting motor 320 is operable to rotate the pinion 302 so as to rotate the lens carrier 256 relative to the rear carrier member 234. The cam followers 294 will then move in the cam slots 292 to move the lens carrier 256 axially forwardly and backwardly. The length and inclination of the cam slots 292 is such that this movement would be 7 mm. The axial length of the pinion 302 is sufficient to maintain engagement with the gear rack 300 during its full axial movement.

Figure 6:
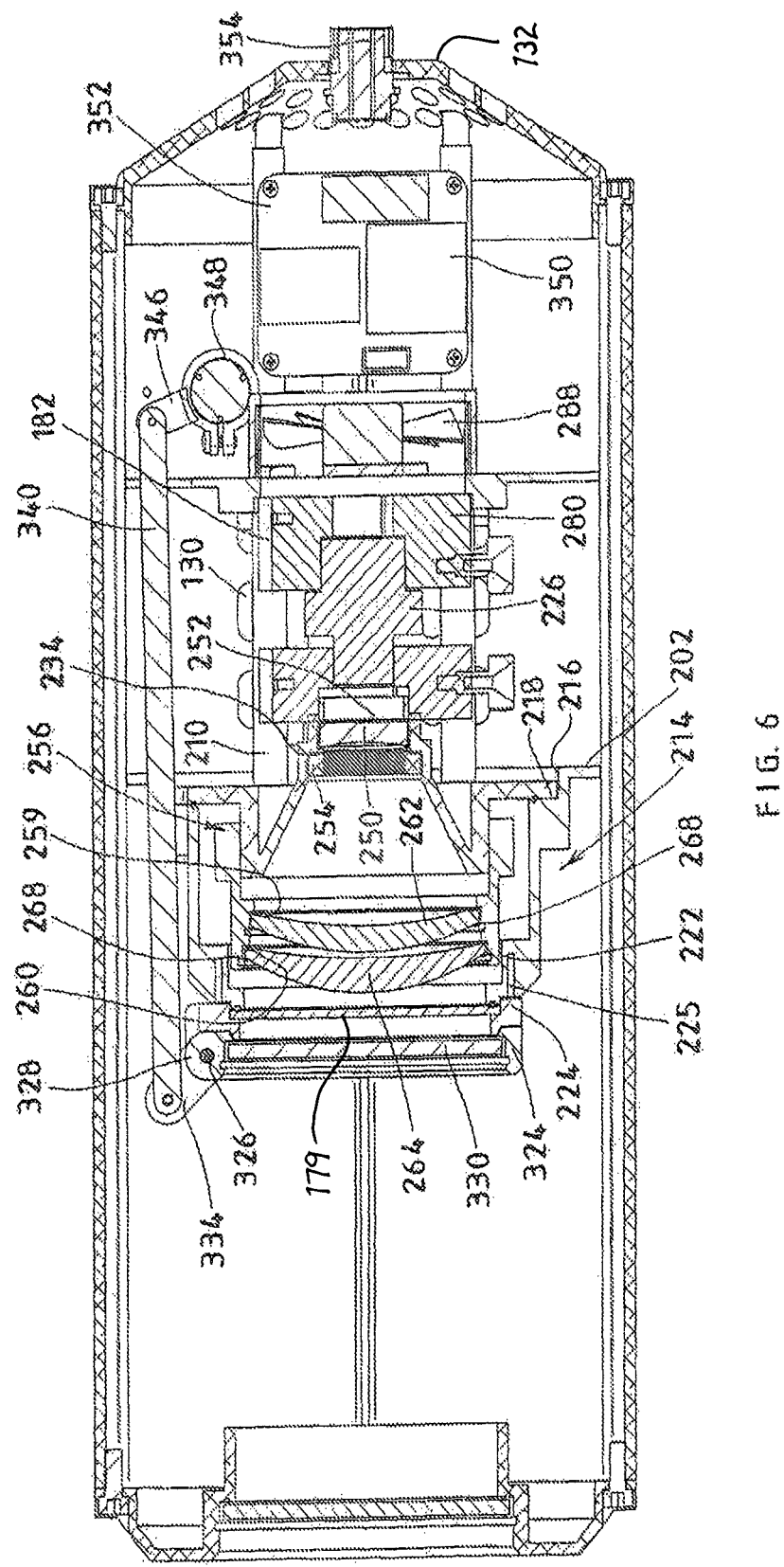
FIG. 6 is a section on line 6-6 of FIG. 2.

A filter carrier 324 is provided. It is pivoted on a pivot pin 326 carried between a pair of lugs 328 carried by the end ring 224. The filter carrier 324 carries an infra-red filter 330 which is slightly larger than the window 179. The filter 330 rests against a step in the filter carrier 324 and is held in position by a circlip (not shown). The filter carrier 324 can pivot about the pivot pin 326. (i) An operative position (as shown in FIGS. 5 and 6) in which it lies against the end ring 224 and (ii) an open position in which it lies in a plane parallel to the axis of the lenses 262 and 264. When the filter carrier 324 is in the operative position light passing through the lenses is filtered through the infra-red filter 330. When the filter carrier 324 is in the open position the light from the lenses passes beside the filter carrier 324 and is uninterrupted.

A pair of pins 332 and 334 (see FIG. 10) extending parallel to the pivot pin 326 project from the end ring 224 and the filter carrier 324. An over centre spring 336 joins these pins 332 and 334 to bias the filter carrier 324 into either its operative position or its inoperative position.

A short lever 338 is provided on the filter carrier 324 radial to the pivot pin 326. The cad of the lever 338 is pivotally connected to a narrow rectangular section connecting rod 348. The rod 340 that passes through radial slots 342 and 344 in the plates 202 and 204. The other end the rod 340 is pivotally connected to a similar lever 346 movable by an electric motor 348 also mounted on the posts 206 (hereinafter called "the filter motor").

Electronic control devices 350 mounted on a PCB 352 carried by two posts 206, are provided on the rear side of the rear plate 204 to operate the lamp 228 and the adjusting and filter motors 320 and 334. Suitable switch means (not shown) are provided to operate the control devices to operate the lamp 228 and the adjusting and filter motors 320 and 334. These devices receive power from a cable (not shown) connected to a power pack or control box outside the projector 10. The cable enters the projector 10 through a union 354 passing through the opening 136 at the centre of the conical end piece 104. If desired the power pack or control box can be quite remote from the projector—which might be mounted on a mast or the like.

As mentioned above the lamp 228 has a reflecting mirror 230 behind it. The mirror 230 is parabolic in shape. It is arranged to reflect a spectrum of 200 nm (UV) to 1100 nm (NIR). The lamp optical system, i.e. the high intensity lamp 228, parabolic mirror 230 and lamp window 232, delivers radiant power, on offer by in a beam with the following characteristics viz an approximately Gaussian shaped intensity profile; a total angular spread in radiant power, at the 10% of maximum points, of 9°-12°; projection of the radiant source of a very long distance say 1000 m to 2000 m or more. The characteristics of the negative lens 250 being radii, thickness, glass types and airspaces, and designed to condition the beam in the following ways i.e. to retain the Gaussian shaped intensity profile of the lamp system; to reduce the total angular spread by a factor of 3-4.times. maximum; and to allow adjustment of the angular spread without loss of the intensity profile shape. All three lenses 250, 262 and 264 are manufactured from the high refractive index, mid dispersion Guangming H-LAF52 glass. Lens spacings are normally specified on the optical axis, e.g. the airspace between surface 274 of negative lens 250, and surface 270 of lens 262 is 64.13 mm along the optical axis.

It will be seen that the lenses are in two groups have a common focal point which is a Galilean telescope arrangement. The described arrangement reduces beam divergence as well as other optical abberations and when the positive lens 262 and 264 are spaced at a maximum from the negative lens a very powerful narrow beam with a high energy density to be projected over a great distance which may be a diameter of 35 meters over 1000 meters.

It will in addition be seen that by operating the adjusting motor 320, to move the lenses closer together the beam to be projected can be varied between the very narrow beam as mentioned above to a (comparatively) broad beam that would illuminate an area of one hundred meters diameter at 1000 meters.

It will further be seen that by operating the filter motor 348 the projector 10 may be used with visible light or infra-red light that has passed through an infra-red filter.

The invention is not limited to the precise constructional details hereinbefore described and illustrated in the drawings. For example the negative lens may be a bi-concave lens. The various sizes and spaces mentioned may be varied. The enclosure 106 may be open or may carry a plane glass window to protect the interior of the projector. Although the projector is referred to herein as a military projector it may be used for other non-military purposes.

The invention claimed is:
1. A military projector comprising:
a tubular housing that contains a high intensity lamp,
a reflecting mirror behind the high intensity lamp,
a negative lens which is carried in a first mounting member located in front of the lamp,
a pair of positive meniscus lenses which are mounted in a second mounting member spaced from the negative lens, and
a filter carrier adapted to carry an infra-red filter, the filter carrier being pivoted to the second mounting member so as to pivot about a pivot between an operative position in which the filter is in the path of rays passing through the meniscus lenses and an inoperative position outside said path and by a moving means provided to move the filter carrier from the operative to the inoperative position and vice versa;
wherein the second mounting member is movable relative to the first mounting member so that the distance between the negative lens and the positive meniscus lenses can be varied.
2. The military projector as claims in claim 1, wherein the second mounting member is rotatable relative to the first mounting member which is fixed axially relative to the housing.
3. The military projector as claimed in claim 2, further comprising cam and cam follower means connecting the two mounting members so that when there is relative rotation between the mounting members, the second mounting member will be moved towards or away from the first mounting member.

4. The military projector as claims in claim 3, wherein the cam and cam follower means comprise a plurality of cams and a plurality of cam followers respectively engaging the cams.

5. The military projector as claims in claim 4, wherein the cams are cam grooves formed in the first mounting member and the cam followers are pins carried by the second mounting member.

6. The military projector as claimed in claim 2, further comprising a toothed part mounted on the second mounting member and a pinion engaging the toothed part, the pinion being rotatable by a motor to rotate the second mounting member.

7. The military projector as claims in claim 1, wherein the moving means includes an electronic motor.

8. The military projector as claimed in claim 7, wherein the filter carrier has a lever pivoted at its free end to a connecting member at the other end of which is movable by an electronic motor.

9. The military projector as claimed in claim 1, wherein the reflecting mirror forms a part of the high intensity lamp.

10. The military projector as claimed in claim 1, wherein the high intensity lamp is a short arc Xenon ceramic lamp.

11. The military projector as claimed in claim 1, further comprising a main heat sink at one end of the lamp and a secondary heat sink at the other end of the lamp.

12. The military projector as claimed in claim 11, wherein the main heat sink and the secondary heat sink are spaced from each other to prevent arcing.

13. The military projector as claimed in claim 1, further comprising a fan positioned to cool the lamp in use.

14. The military projector as claimed in claim 13, further comprising vent openings in the body of the housing at about the location of the lamp and a pair of baffles within the body on either side of the lamp and the vents so that air blown by the fan over the lamp escapes through the vents.

* * * * *